(12) United States Patent
Bringuier et al.

(10) Patent No.: US 10,294,354 B2
(45) Date of Patent: May 21, 2019

(54) POLYMER COMPOSITION FOR FIBER OPTIC CABLE HAVING LOW THERMAL STRAIN AND METHODS OF MANUFACTURING THE SAME

(71) Applicant: CORNING OPTICAL COMMUNICATIONS LLC, Hickory, NC (US)

(72) Inventors: Anne Germaine Bringuier, Taylorsville, NC (US); Xiaole Cheng, Painted Post, NY (US); Brandon Robert Williamson, Johnson City, TN (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 16/177,990

(22) Filed: Nov. 1, 2018

(65) Prior Publication Data

US 2019/0071562 A1    Mar. 7, 2019

Related U.S. Application Data

(63) Continuation of application No. 15/811,825, filed on Nov. 14, 2017, now Pat. No. 10,131,774.

(Continued)

(51) Int. Cl.
*C08L 23/06* (2006.01)
*C08L 23/04* (2006.01)
*G02B 6/44* (2006.01)

(52) U.S. Cl.
CPC .......... *C08L 23/06* (2013.01); *C08L 23/04* (2013.01); *G02B 6/443* (2013.01);
(Continued)

(58) Field of Classification Search
CPC ...... C08L 23/06; C08L 23/04; C08L 2207/04; C08L 2205/03; C08L 2205/035; C08L 2203/202; G02B 6/443
See application file for complete search history.

(56) References Cited

U.S. PATENT DOCUMENTS 5,574,816 A    11/1996  Yang et al.
6,215,931 B1    4/2001  Risch et al.
(Continued)

FOREIGN PATENT DOCUMENTS

WO    2016060647 A1    4/2016
WO    2016133693 A1    8/2016

*Primary Examiner* — Andrew Jordan
(74) *Attorney, Agent, or Firm* — William D. Doyle

(57) ABSTRACT

A polymer composition is provided. The polymer composition includes a polyolefin, at least 30% by weight of a thermoplastic elastomer, and a filler material. When the polymer composition is formed into an article having a longitudinal axis, the polymer composition has an average coefficient of thermal expansion along a longitudinal axis of less than or equal to $150 \times 10^{-6}$ m/mK as measured from $-40°$ C. to $25°$ C. Further, the polymer composition has an elastic modulus of less than 3000 MPa as measured using dynamic mechanical analysis (ASTM D4065), and the polymer composition has an elongation at break of greater than 200% along the longitudinal axis (measured according to ASTM D638). An article made from the polymer composition and a cable including the polymer composition are also provided.

18 Claims, 3 Drawing Sheets

Related U.S. Application Data

(60) Provisional application No. 62/422,824, filed on Nov. 16, 2016.

(52) U.S. Cl.
CPC ..... *C08L 2203/202* (2013.01); *C08L 2205/03* (2013.01); *C08L 2205/035* (2013.01); *C08L 2207/04* (2013.01)

(56) References Cited

U.S. PATENT DOCUMENTS

| | | | |
|---|---|---|---|
| 6,372,344 B1 | 4/2002 | Castellani et al. | |
| 7,801,404 B2 | 9/2010 | Pavan et al. | |
| 9,323,022 B2* | 4/2016 | Bringuier | G02B 6/443 |
| 9,720,202 B2* | 8/2017 | Bringuier | G02B 6/4495 |
| 9,829,664 B2* | 11/2017 | Baca | G02B 6/443 |
| 10,131,774 B2* | 11/2018 | Bringuier | C08L 23/06 |
| 2002/0118933 A1 | 8/2002 | Dixon et al. | |
| 2002/0151642 A1* | 10/2002 | Nakagawa | C08L 23/10 524/505 |
| 2003/0232207 A1* | 12/2003 | Thullen | B32B 1/08 428/476.3 |
| 2008/0212927 A1 | 9/2008 | Pavan et al. | |
| 2008/0227887 A1 | 9/2008 | Klier et al. | |
| 2015/0370023 A1 | 12/2015 | Baca et al. | |
| 2016/0054531 A1* | 2/2016 | Baca | G02B 6/4432 385/110 |
| 2016/0178864 A1* | 6/2016 | Bringuier | G02B 6/4495 385/100 |
| 2017/0146756 A1* | 5/2017 | Baca | G02B 6/443 |
| 2018/0059346 A1* | 3/2018 | Baca | G02B 6/443 |
| 2018/0134883 A1* | 5/2018 | Bringuier | C08L 23/06 |

* cited by examiner

POLYMER COMPOSITION FOR FIBER OPTIC CABLE HAVING LOW THERMAL STRAIN AND METHODS OF MANUFACTURING THE SAME

CROSS-REFERENCE TO RELATED APPLICATIONS

This application is a continuation of U.S. application Ser. No. 15/811,825, filed on Nov. 14, 2017, which claims the benefit of priority to U.S. Application No. 62/422,824, filed Nov. 16, 2016, both applications being incorporated herein by reference.

BACKGROUND

Some polyolefins have advantageous properties for use as cable jacketing materials for a variety of cable types. In particular, these polyolefins have good flexibility and are able to maintain certain relevant mechanical properties over a range of operating temperatures. The polyolefins can be extruded to surround the cable so as to help protect the interior components of the cable from the environment in which the cable is deployed.

SUMMARY

In one aspect, a polymer composition is provided. The polymer composition includes a polyolefin, at least 30% by weight of a thermoplastic elastomer, and a filler material. When the polymer composition is formed into an article having a longitudinal axis, the polymer composition has an average coefficient of thermal expansion along a longitudinal axis of less than or equal to 150×10-6 m/mK as measured from −40° C. to 25° C. Further, the polymer composition has an elastic modulus of less than 3000 MPa as measured using dynamic mechanical analysis (ASTM D4065), and the polymer composition has an elongation at break of greater than 200% along the longitudinal axis (measured according to ASTM D638).

In another aspect, an extruded polymer article is provided. The polymer article has a longitudinal axis generally in the direction of extrusion. The polymer article is comprised of a polymer composition that includes a polyolefin, at least 30% by weight of a thermoplastic elastomer, and a filler material. The polymer composition has an average coefficient of thermal expansion along the longitudinal axis of less than or equal to 150×10−6 m/mK as measured from −40° C. to 25° C. Further, the polymer composition has an elastic modulus of less than 3000 MPa as measured using dynamic mechanical analysis (ASTM D4065).

In yet another aspect, a cable is provided. The cable includes at least one communication element, and a polymeric jacket that surrounds the at least one communication element. The polymeric jacket is formed at least in part from a polymer composition including a polyolefin, at least 30% by weight of a thermoplastic elastomer, and a high aspect ratio filler material. The polymer composition is extruded to form the polymeric jacket, and the polymeric jacket defines a longitudinal axis generally in the direction of extrusion. The polymer composition has an average coefficient of thermal expansion (CTE) along the longitudinal axis of less than or equal to 150×10–6 m/mK as measured from −40° C. to 25° C. and an elastic modulus of less than 3000 MPa as measured using dynamic mechanical analysis (ASTM D4065).

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
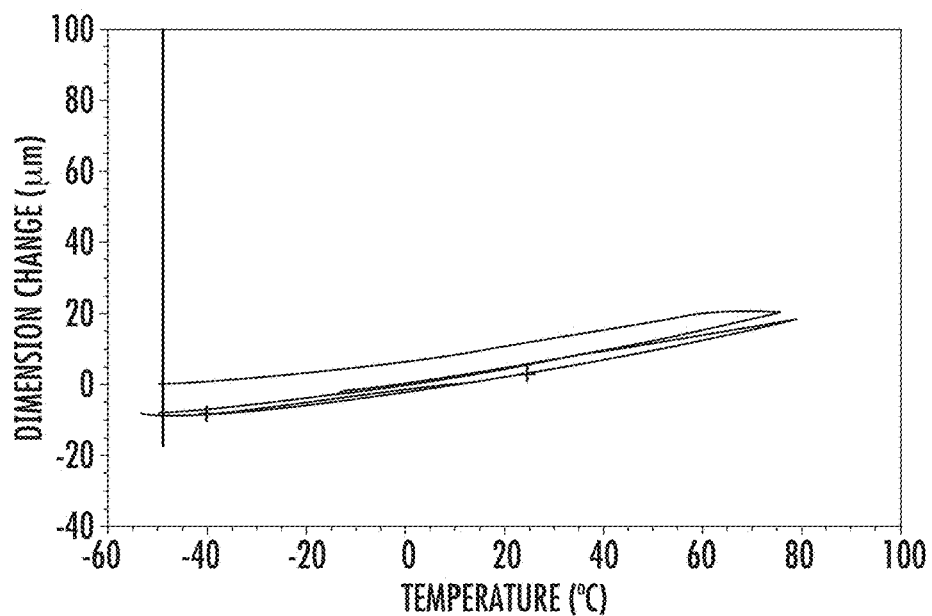
FIG. 1 is a graphical representation of the coefficient of thermal expansion as measured for a polymer composition made according to an exemplary embodiment.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring generally to the figures, various embodiments of a polymer composition having low thermal strain are provided. The polymer composition generally comprises a polyolefin, a thermoplastic elastomer, and a high aspect ratio filler. Embodiments of the polymer composition have a coefficient of thermal expansion (CTE) in an extrusion direction of less than $150 \times 10^{-6}$ m/mK and an elastic modulus of less than 3000 MPa. In embodiments, the polymer composition can be used to reduce the thermal strain on optic fiber cable components (e.g., outer cable jackets, inner cable jackets, binder layers, etc.) for cables such as loose tube cables, ribbon cables, indoor cables, etc. While embodiments of the polymer composition are discussed in the context of optic fiber cables, such discussion is not intended to limit the possible contexts and applications in which the polymer composition can be utilized.

As mentioned above, the disclosed polymer composition has particular applicability for reducing the thermal strain in loose tube optic fiber cable. One way to express the thermal strain of a loose tube cable is provided in the following equation:

$$\varepsilon_T(T_o) = \frac{\sum_{cable}\left(E_i(T)A_i \int_{T_a}^{T_o} \alpha_i(T)dT\right)}{\sum_{cable}(E_i(T)A_i)}$$

where, E is a material's elastic modulus, A is a material's cross-sectional area, and a is a material's CTE. As indicated in the equation, the CTE and elastic modulus both influence the thermal strain ET experienced by an optic fiber cable. Thus, in order to reduce the thermal strain on a cable, both the CTE and elastic modulus have to be considered in the operating temperature range of the optic fiber cable. However, efforts to reduce the CTE generally have the inverse impact on the elastic modulus, and vice versa, especially when fillers are introduced into the polymer composition, which means that the overall thermal strain is not changed. In contrast, embodiments of the disclosed polymer composition provide a reduced CTE along the cable length while still maintaining the elastic modulus such that the thermal strain along the cable length is reduced.

In embodiments, the polymeric composition includes a polyolefin, a thermoplastic elastomer, and at least one filler material. In exemplary embodiments, the polyolefin can include one or more of medium-density polyethylene (MDPE), high-density polyethylene (HDPE), low-density polyethylene (LDPE), linear low-density polyethylene (LLDPE), and polypropylene (PP). In other embodiments, a different polyolefin can also be used.

In an embodiment, the polymer composition includes at least 30% by weight of the thermoplastic elastomer. In further embodiments, the polymer composition includes less than 60% by weight of the thermoplastic elastomer. In other embodiments, the polymer composition includes less than 50% by weight of the thermoplastic elastomer, and in additional embodiments, the polymer composition includes less than 40% by weight of the thermoplastic elastomer. Exemplary thermoplastic elastomers suitable for use in the polymer composition include (but are not limited to) ethylene-propylene rubber (EPR), ethylene-propylene-diene rubber (EPDM), ethylene-octene (EO), ethylene-hexene (EH), ethylene-butene (EB), ethylene-vinyl acetate (EVA), and styrene-ethylene-butadiene-styrene (SEBS), thermoplastic vulcanizates (CPV [e.g., Santoprene available from Exxon-Mobil Chemical]), polyolefin elastomers (POE), ethylene/ alpha-olefin copolymers (e.g., Exact plastomers available from ExxonMobil Chemical) and combinations thereof. In a particular embodiment, thermoplastic elastomer used in the polymer composition has a shear viscosity that is lower than or equal to the shear viscosity of the polyolefin when measured at 200° C. and 100 s$^{-1}$. As will be discussed in more detail below, this increases the stability of the highly oriented co-continuous morphology during extrusion, maintaining the low CTE advantage disclosed herein.

The particles of the filler material used in the polymer composition have a high aspect ratio, i.e., a high width to thickness ratio or a high length to width ratio. In an embodiment, the particles of filler material have an aspect ratio of 5 or higher. In specific embodiments, the inorganic fillers can be platelike or fibrous/rodlike. Examples of platelike fillers include mica, talc, montmorillonite (MMT), kaolinite, bentonite, synthetic clay, and other clays. Examples of fibrous/rodlike fillers include wood flour (WF), glass fiber (GF), halloysite, wollastonite, magnesium oxysulfate, and other reinforced fibers. In an embodiment, the polymeric composition includes less than 30% by weight of the filler material. In a further embodiment, the polymer composition includes less than 20% by weight of the filler material, and in still another embodiment, the polymer composition includes less than 10% by weight of filler material.

The polymer composition can include other processing and/or performance additives. For example, a dispersant and a compatibilizer may be added to aid dispersion of the inorganic filler, to improve compatibilities between polymer matrices, and/or to stabilize the phase morphology. An exemplary compatibilizer would be a block copolymer that has alternating olefin blocks and one or more other monomer blocks. For example, one suitable compatibilizer for SEBS is a copolymer with alternating blocks of polyethylene and styrene-containing segments. In another example, the compatibilizer is a polymer having a polyolefin backbone that is grafted with a monomer in which the monomer is compatible with the selected thermoplastic elastomer. Another possible additive for the polymer composition is carbon black, which can help absorb ultra-violet light for outdoor applications of the polymer composition. Still further, the polymer composition can include up to 1% by weight of a low friction additive, such as a fatty acid or a fatty acid amide. For example, the fatty acid can have a carbon backbone of between $C_6$ to $C_{25}$ and be saturated or unsaturated. Specific examples include caprylic acid, capric acid, lauric acid, myristic acid, palmitic acid, stearic acid, arachidic acid, behenic acid, lignoceric acid, cerotic acid, etc. Similarly, the fatty acid amid can have carbon backbones, for example, of between $C_6$ and $C_{25}$ and be saturated or unsaturated.

In embodiments, the polymer composition is prepared via extrusion or injection molding. In a specific embodiment, the polymer composition is prepared via twin screw extrusion. In the particular context of an optic fiber cable, the polymer composition can be extruded as a jacket for an optic fiber cable and/or another component. Upon extrusion or injection molding, the polymer composition will have either a droplet-dispersed morphology in which elastomer droplets uniformly disperse in polyolefin matrix or a co-continuous morphology in which both elastomer and polyolefin form the continuous phases. Additionally, shear or extensional forces exerting during extrusion or injection molding affects the morphology of the polymer composition such that the morphology is elongated to a microfibril (e.g., droplet dispersed morphology) or extended to a microlayer (e.g., co-continuous morphology). The resultant morphology primarily depends on the compatibility and viscoelasticity of the polyolefin and thermoplastic elastomer. Because of the highly directional nature of extrusion and injection molding, the filler material and elastomer phase will be highly orientated along the extrusion/injection direction and will exhibit anisotropic shapes, i.e., a large amount of microfibrils or microlayers are formed and oriented. Because the elastic modulus of the polyolefin will generally be higher than that of the thermoplastic elastomers, the thermal expansion of the thermoplastic elastomer domains is restricted by the polyolefin domains. Additionally, the filler material can be selected or engineered to evenly disperse in both the polyolefin or thermoplastic elastomer phases or selectively localize predominantly in just one of the phases.

The anisotropy of the resultant phase morphology reduces the CTE in the extrusion direction, which in the case of a cable jacket is along the longitudinal axis of the cable. In an embodiment, the CTE of the polymer composition in the extrusion direction is less than $150 \times 10^{-6}$ m/mK. In another embodiment, the CTE of the polymer composition in the extrusion direction is less than $120 \times 10^{-6}$ m/mK, and in a further embodiment, the CTE of the polymer composition in the extrusion direction is less than $100 \times 10^{-6}$ m/mK. In embodiments, the CTE values represent averages taken of measurements of the CTE between $-40°$ C. and $25°$ C.

As discussed above, the CTE is only one of the two major components of thermal strain with the other being the elastic modulus. Generally, the addition of filler materials to a polymer will cause an increase in elastic modulus; however, in the disclosed polymer compositions, the inclusion of the thermoplastic elastomer allows the elastic modulus to decrease or to remain the same despite the inclusion of a filler. In an embodiment, the elastic modulus (alternatively, storage modulus) at $-40°$ C. as measured by dynamic mechanical analysis (DMA) is less than 3000 MPa as measured in accordance with ASTM D4065. In a further embodiment, the elastic modulus at $-40°$ C. as measured by DMA is less than 2500 MPa, and in still another embodiment, the elastic modulus at $-40°$ C. as measured by DMA is less than 2000 MPa. In a particular embodiment, the thermoplastic elastomer has a low glass transition temperature, such as $-20°$ C. or lower. In another embodiment, the glass transition temperature is $-40°$ C. or lower, and in still another embodiment, the glass transition temperature is $-60°$ C. or lower. The low glass transition temperature allows for the retention of an elongation at break of at least 200% (as measured by ASTM D638) over the temperature range of $-40°$ C. to $80°$ C., which corresponds to the potential operating range of an optic fiber cable. In embodiments, the elongation at break is at least 400% over the operating temperature range of an optic fiber cable.

Examples

Several exemplary polymer compositions were made according to the embodiments disclosed herein. In particular, polymer compositions based on MDPE were developed by mixing MDPE with various thermoplastic elastomers and filler materials. Table 1 discloses the composition and properties of these exemplary MDPE polymer compositions.

TABLE 1

Formulations and Properties Polymer Compositions

| | Formulation | Weight Ratio | E' at -40° C. (MPa) | CTE ($\times 10^{-6}$ m/mK) | Elongation at Break (%) |
|---|---|---|---|---|---|
| Comparative Examples: | | | | | |
| 1 | MDPE | 100/0/0 | 1969 | 168.7 | >800 |
| 2 | MDPE/GF | 80/20 | 6000 | 50 | 6.7 |
| 3 | MDPE/EPR | 70/30 | 1469 | 192.8 | >800 |
| Examples: | | | | | |
| 1 | MDPE/EPR/MMT | 60/30/10 | 1882 | 167.0 | >800 |
| 2 | MDPE/EPR/WF | 60/30/10 | 2073 | 129.4 | >800 |
| 3 | MDPE/EPR/MMT | 50/40/10 | 1786 | 126.0 | >800 |
| 4 | MDPE/EVA/WF | 50/40/10 | 2354 | 93.9 | >800 |
| 5 | MDPE/SEBS/MMT | 50/40/10 | 1760 | 108.2 | >800 |
| 6 | MDPE/SEBS/WF | 50/40/10 | 1528 | 94.9 | >800 |
| 7 | MDPE/SEBS/MMT/WF | 47/38/10/5 | 1830 | 98.9 | ~600 |

The elastic moduli of the exemplary compositions were obtained using DMA. The thermal expansion behavior of the polymer compositions was measured by thermomechanical analysis (TMA) in accordance with ASM E831. In particular, Example 4 of Table 1 was tested using TMA to develop the graph depicted in FIG. 1. As shown there, a sample of Example 4 was cycled between $-40°$ C. and $80°$ C. The first heating cycle was used to eliminate the thermal history of the sample generated during processing. Thereafter, the CTE in the extrusion direction was calculated by averaging the CTE over the temperature range of $-40°$ C. to $25°$ C. over multiple cycles. The CTE for each of the exemplary embodiments of the polymer composition provided in Table 1 were determined in this way.

Initially, as can be seen in Table 1, all of the exemplary compositions 1-7 exhibited an elongation at break of more than 400%. In particular, even the relatively highly-filled Example 7 (15% filler) was able to achieve an elongation at break of greater than 400%, while still reducing the CTE in the extrusion direction and slightly decreasing the elastic modulus as compared to HDPE (Comparative Example 1).

In Comparative Example 2, only glass fiber filler material was added to the HDPE, and as can be seen, the CTE drops from $168 \times 10^{-6}$ m/mK to $50 \times 10^{-6}$ m/mK. However, the elastic modulus at $-40°$ C. increases from 2000 MPa to 6000 MPa at the same time. Therefore, almost no change in the overall thermal strain of the polymer composition is provided.

Regarding the polymer compositions according to the present disclosure, the CTE of Example 1 is approximately the same as the control Comparative Example 1, but the elastic modulus is slightly reduced, which overall provides a reduction in thermal strain. In Example 2, it can be seen that the CTE decreases by 23% while the elastic modulus increased by only about 5%. The CTE and elastic modulus of Example 3 are both reduced by 25% and 9%, respectively. For Example 4, the CTE is drastically reduced by about 44%, but the elastic modulus is increased by about 20%. As can be seen when comparing Examples 1-4, the relative amount of the thermoplastic elastomer and the selection of the filler material and thermoplastic elastomer have an influence on the final properties of the polymer composition. Comparing Examples 1 and 2, the substitution of MMT with WF produced a significant reduction in the CTE. Comparing Examples 1 and 3, the inclusion of 10% more EPR (thermoplastic elastomer) by weight also provided a significant reduction in the CTE as well as the elastic modulus. Additionally, Examples 1 and 4 demonstrate that WE can provide significant reductions in CTE with only modest increases in elastic modulus.

Turning to Example 5, the CTE is reduced by about 36% with an accompanying reduction of elastic modulus of about 11%. In Example 6, the CTE is reduced by almost 44%, and the elastic modulus is reduced by more than 22%. In Example 7, a combination of filler materials is used. Specifically, in Example 7, the 10% by weight of MMT and 5% by weight of WF were added to the MDPE and SEBS. As mentioned above, despite the relatively high amount of filler material, Example 7 provides a 41% reduction in CTE and a 7% reduction in elastic modulus. In embodiments of the polymer composition adapted for low temperature applications, SEBS is chosen as the thermoplastic elastomer because its butadiene soft blocks typically have a low glass transition temperature of −90° C. The low glass transition temperature helps to ensure that the elastic modulus remains the same at cold temperature.

Figure 2A:
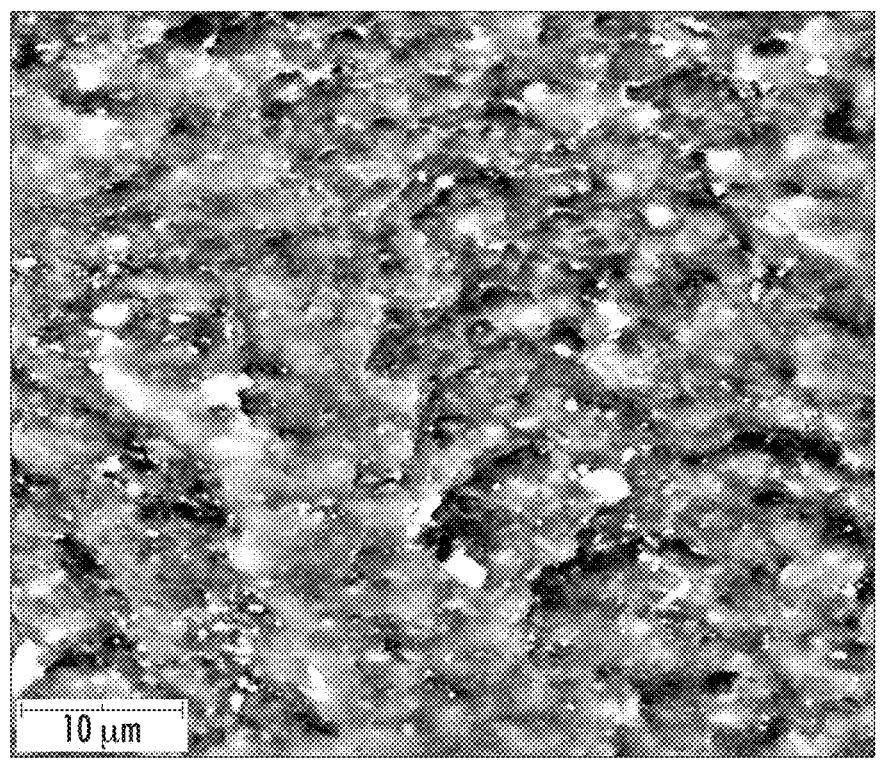
FIG. 2A is a scanning electron microscope (SEM) micrograph of a cross section of a polymer composition taken perpendicular to the extrusion direction, according to another exemplary embodiment.
Figure 2B:
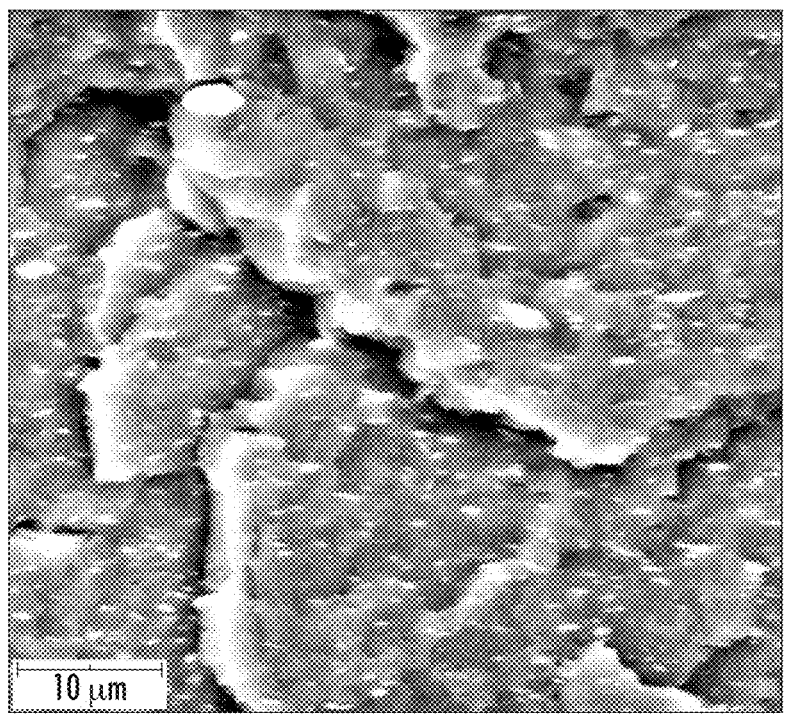
FIG. 2B is an SEM micrograph of a cross section of the same polymer composition as shown in FIG. 2A taken parallel to the extrusion direction, according to an exemplary embodiment.

The exemplary polymer compositions were also analyzed using a scanning electron microscope (SEM). FIG. 2A shows an SEM micrograph of Example 1 viewed perpendicular to the cable axial direction. FIG. 2B shows an SEM micrograph of the same polymer composition viewed parallel to the cable axial direction. As can be seen in FIGS. 2A and 2B, the MMT particles (the white flecks in the micrograph) are well dispersed in the sub-micrometer scale with few agglomerates that are larger than 10 μm. In comparing FIGS. 2A and 2B, it can be seen that there is a difference in orientation and length of MMT particles along the two directions. MMT particles in the parallel direction shown in FIG. 2B are longer and better aligned than those in the perpendicular direction shown in FIG. 2A. The anisotropy of the MMT particles stems from the elongational force (e.g., from extrusion and drawing-down) that was applied during melting processing.

Figure 3A:
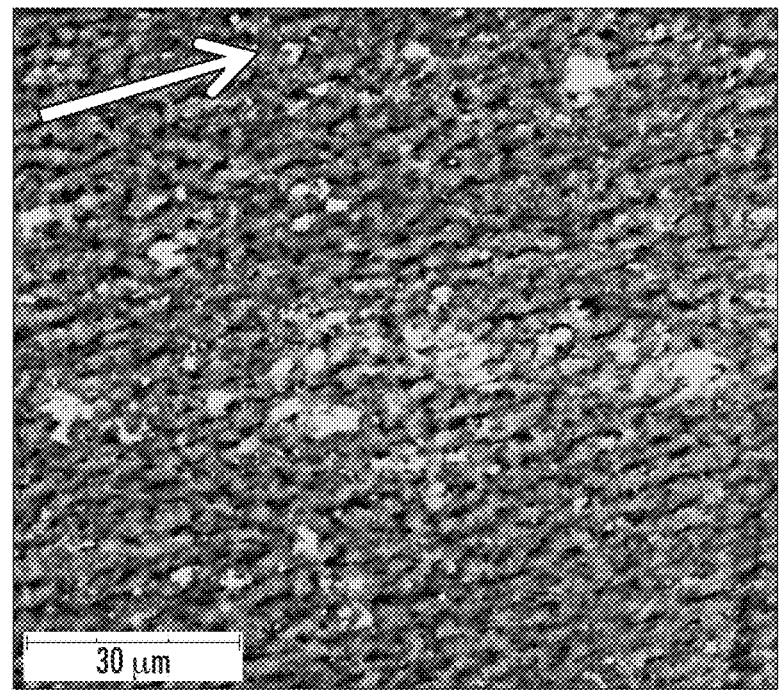
FIG. 3A is an SEM micrograph of an etched cross section of the polymer composition of FIG. 2B, according to an exemplary embodiment.
Figure 3B:
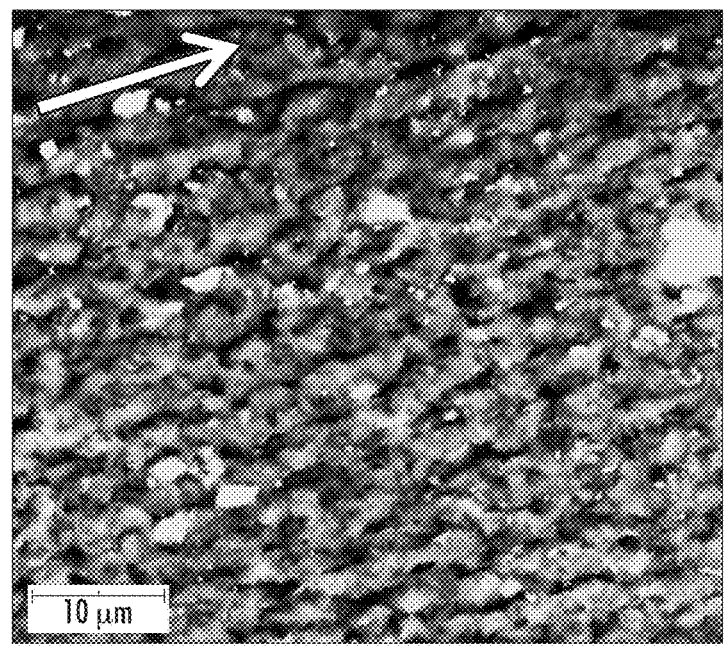
FIG. 3B is the SEM micrograph of FIG. 3A at a higher magnification, according to an exemplary embodiment.

The polymer compositions shown in FIG. 2B was further etched by solvent to remove the thermoplastic elastomer domains. The etched parallel surface of FIG. 2B is shown in FIGS. 3A and 3B, with FIG. 3B being twice the magnification of FIG. 3A. In FIGS. 3A and 3B, the blank areas shown in the SEM micrographs of the etched surface correspond to the thermoplastic elastomer domains. As can be seen, the thermoplastic elastomer domains are elongated in the extruded direction (denoted by the arrow in the upper lefthand corner of the micrograph) and deformed into microfibrils or microlayers, i.e., the polymer composition exhibits an anisotropic, co-continuous phase morphology. As discussed above, the anisotropy contributes to the lowering of the polymer composition's CTE in the extrusion direction; however, the overall bulk CTE will remain the same (which means that the CTE in the radial directions perpendicular to the extrusion direction will increase.

Additionally, the exemplary polymer compositions were tested to determine the thermal contraction stress. Testing was performed using DMA in the temperature range of 35° C. to −40° C. according to ASTM D4065. Specifically, extruded samples having a thickness of 2 mm were cooled from 35° C. to −40° C. at a rate of 1.0° C. per minute. The samples were then held at −40° C. for sixty minutes. For Comparative Example 1 (IMRE), the thermal contraction stress was measured to be 7.6 MPa. For the exemplary polymer compositions disclosed herein, the thermal contraction stress was less than 3.0 MPa.

Figure 4:
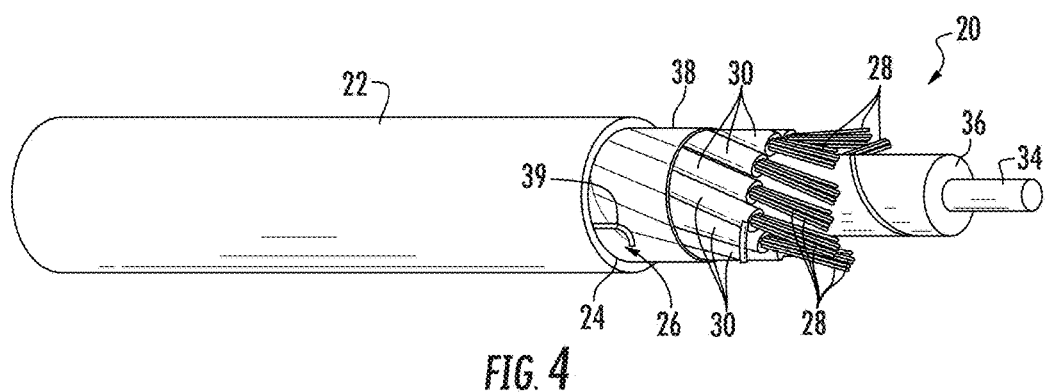
FIG. 4 is an illustration of an optic fiber cable in which components of the cable include polymer compositions made according to exemplary embodiments.

The polymer composition disclosed herein can be applied in a variety of contexts. In a particular embodiment shown in FIG. 4, the polymer composition is used as a jacket for a cable or cable component. The cable shown in FIG. 4 is a fiber optic cable 20. Cable 20 includes a cable body, shown as cable jacket 22, having an inner surface 24 that defines a channel, shown as central bore 26. Pluralities of communication elements, shown as optical fibers 28, are located within bore 26. The cable 20 includes a plurality of core elements located within central bore 26. A first type of core element is an optical transmission core element, and these core elements include bundles of optical fibers 28 that are located within tubes, shown as buffer tubes 30. Buffer tubes 30 are arranged around a central support, shown as central strength member 34. Central strength member 34 includes an outer coating layer 36. A barrier material, such as water barrier 38, is located around the wrapped buffer tubes 30. An easy access structure, shown as rip cord 39, may be located inside cable jacket 22 to facilitate access to buffer tubes 30.

In one embodiment, the polymer composition is incorporated into the cable jacket 22 of fiber optic cable 20. In another embodiment, the polymer composition is used to upcoat the central strength member 34 to form the outer coating layer 36. For example, the selection of the number of buffer tubes 30 can define an interior open geometry that is filled/supported by the central strength member 34 and outer coating layer 36. In order to reduce the cost of the optic fiber cable 20, the central strength member 34 can be made as thin as possible while still providing the necessary support for the cable 20. The remainder of the interior open geometry can be filled with the outer coating layer 36 by upcoating the polymer composition on the central strength member 34. In this way, the cost of providing the central strength member 34 and outer coating layer 36 is reduced as the presently disclosed polymer composition used to form the outer coating layer 36 is generally less expensive in terms of material cost than the central strength member 34.

Also, using the polymer composition disclosed herein provides several advantages. In particular, the polymer composition can be used to produce optic fiber cables with enhanced thermal performance and reduced manufacturing cost. Ultimately, incorporating the disclosed polymer composition in various components of the optic fiber cables can help to realize the goals of reducing buffer tube size, shortening lay lengths, and driving cable design to concurrent performance limits under load and at low temperature. Further, in contrast to certain polymer compositions that, in some circumstances, may have a relatively low elongation at break throughout the operating temperature range and that produce a rigid jacket likely to crack under impact, bending, and/or twisting stresses at low temperatures, the presently disclosed polymer composition can help to produce an optical cable with significantly improved temperature cycling performance. Also, in contrast to certain low-CTE polymer compositions that contain a high amount of filler, the polymer compositions made according to the present disclosure do not have a high modulus, poor toughness, or poor appearance, nor are the presently disclosed polymer compositions difficult to process based on a high filler content.

Further, polymer compositions made according to the embodiments disclosed herein offer several additional advantages when used as components for optic fiber cable. For example, the polymer composition can help expand the optical fiber cable operating temperature range to −40° C. or below. Also, the lower thermal contraction stress of less than 3.0 MPa can reduce the attenuation of optic fibers in contact with the polymer composition that results from the contraction of the polymer composition in cold environments. Additionally, the polymer composition can allow for smaller buffer tubes to be used, resulting in lower material cost and lower overall product cost. As discussed above, the polymer composition can help to reduce the diameter (and consequently the cost) of the central strength member. Further, because of the potential to produce smaller cable sizes by using the disclosed polymer composition, the resultant cable is expected to have better blowing performance during installation. In another embodiment, a cable having a jacket made of the disclosed polymeric composition can also include an additional outer layer of LLDPE, MDPE, HDPE, etc. to lower the coefficient of friction of the resulting cable when the cable is blown inside a duct. In such embodiments, the outer layer can be thinner than the cable jacket.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be interred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A polymer composition comprising:
a polyolefin; and
at least 30% by weight of a thermoplastic elastomer;
wherein the polymer composition has an elastic modulus of less than 2000 MPa as measured using dynamic mechanical analysis (ASTM D4065), an elongation at break of greater than 200% along the longitudinal axis (measured according to ASTM D638), and a thermal contraction stress of less than 3.0 MPa as measured using dynamic mechanical analysis.

2. The polymer composition of claim 1, wherein the polyolefin is selected from the group consisting of medium-density polyethylene, high-density polyethylene, low-density polyethylene, linear low-density polyethylene, polypropylene, and combinations thereof.

3. The polymer composition of claim 1, comprising less than 60% by weight of the thermoplastic elastomer.

4. The polymer composition of claim 1, wherein the thermoplastic elastomer is selected from the group consisting of ethylene-propylene rubber, ethylene-propylene-diene rubber, ethylene-octene, ethylene-hexene, ethylene-butene, ethylene-vinyl acetate, styrene-ethylene-butadiene-styrene, thermoplastic vulcanizates, polyolefin elastomers, ethylene/alpha-olefin copolymers, and combinations thereof.

5. The polymer composition of claim 1, wherein the thermoplastic elastomer has a shear viscosity that is lower than or equal to the shear viscosity of the polyolefin when measured at 200° C. and 100 s$^{-1}$.

6. The polymer composition of claim 1, further comprising less than 30% by weight of a filler material.

7. The polymer composition of claim 6, wherein the filler material is selected from the group consisting of mica, talc, montmorillonite, kaolinite, bentonite, synthetic clay, and combinations thereof.

8. The polymer composition of claim 6, wherein the filler material is selected from the group consisting of wood flour, glass fiber, halloysite, wollastonite, magnesium oxysulfate, and combinations thereof.

9. The polymer composition of claim 1, wherein the thermoplastic elastomer has a glass transition temperature that is less than −20° C.

10. The polymer composition of claim 1, comprising up to 1% of a low friction additive selected from the group consisting of a fatty acid, fatty acid amide, and combinations thereof.

11. An extruded polymer article, the polymer article having a longitudinal axis generally in the direction of extrusion, the polymer article comprising:
a polymer composition, comprising:
a polyolefin; and
at least 30% by weight of a thermoplastic elastomer;
wherein the polymer composition has an elastic modulus of less than 2000 MPa and a thermal contraction stress of less than 3.0 MPa as measured using dynamic mechanical analysis (ASTM D4065).

12. The extruded polymer article of claim 11, wherein the extruded polymer article is a jacket for a cable and the longitudinal axis is along the length of the cable.

13. The extruded polymer article of claim 11, wherein the extruded polymer a e is an outer coating layer of a central strength member of a fiber optic cable.

14. A cable comprising:
at least one communication element;
a polymeric jacket that surrounds the at least one communication element;
wherein the polymeric jacket is formed at least in part from a polymer composition comprising:
a polyolefin; and
at least 30% by weight of a thermoplastic elastomer;
wherein the polymer composition is extruded to form the polymeric jacket, the polymeric jacket defining a longitudinal axis generally in the direction of extrusion;
wherein the polymer composition has an elastic modulus of less than 2000 MPa and a thermal contraction stress of less than 3.0 MPa as measured using dynamic mechanical analysis (ASTM D4065).

15. The cable of claim 14, wherein the at least one communication element comprises an optical fiber.

16. The cable of claim 14, further comprising:
a central strength member that runs along at least a portion of a length of the cable;
wherein the central strength member includes a coating of the polymer composition along the length of the central strength member.

17. The cable of claim 14, wherein a CTE in a radial direction is greater than the CTE along the longitudinal axis.

18. The cable of claim 14, wherein the polymeric jacket is coextruded with an outer layer of a material selected from the group consisting of linear low-density polyethylene, medium-density polyethylene, high-density polyethylene, and combinations thereof, and wherein the outer layer is thinner than the polymeric jacket.

* * * * *

UNITED STATES PATENT AND TRADEMARK OFFICE
CERTIFICATE OF CORRECTION

PATENT NO. : 10,294,354 B2
APPLICATION NO. : 16/177990
DATED : May 21, 2019
INVENTOR(S) : Anne Germaine Bringuier et al.

Page 1 of 1

It is certified that error appears in the above-identified patent and that said Letters Patent is hereby corrected as shown below:

In the Claims

In Column 10, Line 27 (approx.), Claim 13, delete "a e" and insert -- article --, therefor.

Signed and Sealed this
Twenty-first Day of January, 2020

Andrei Iancu
*Director of the United States Patent and Trademark Office*